(12) United States Patent
Lee

(10) Patent No.: US 10,324,363 B2
(45) Date of Patent: Jun. 18, 2019

(54) IMAGE DEVICE CAPABLE OF COMPENSATING IMAGE VARIATION

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/903,048

(22) Filed: Feb. 23, 2018

(65) Prior Publication Data

US 2018/0239226 A1    Aug. 23, 2018

Related U.S. Application Data

(60) Provisional application No. 62/462,363, filed on Feb. 23, 2017.

(51) Int. Cl.
| | |
|---|---|
| *G03B 21/14* | (2006.01) |
| *G02B 13/06* | (2006.01) |
| *H04N 5/232* | (2006.01) |
| *G06T 5/00* | (2006.01) |

(52) U.S. Cl.
CPC ............. *G03B 21/14* (2013.01); *G02B 13/06* (2013.01); *G06T 5/00* (2013.01); *H04N 5/23238* (2013.01); *H04N 5/23258* (2013.01)

(58) Field of Classification Search
CPC ........... H04N 5/23258; H04N 5/23238; G03B 21/14; G02B 13/06; G06T 5/00

USPC ............................................................ 348/37
See application file for complete search history.

(56) References Cited

U.S. PATENT DOCUMENTS

| | | | |
|---|---|---|---|
| 2013/0301946 A1* | 11/2013 | Rossato ................ | H04N 19/30 382/236 |
| 2016/0014335 A1* | 1/2016 | Chuang ............ | G08B 13/19602 348/36 |
| 2016/0269664 A1* | 9/2016 | Duparre ............ | H01L 27/14621 |

OTHER PUBLICATIONS

R. M. F. Galego, "Geometric and radiometric calibration for pan-tilt surveillance cameras",Dissertação para a obtenção do Grau de Mestre em Engenharia Electrotécnica e de Computadores, Junho de 2011.

* cited by examiner

*Primary Examiner* — Allen C Wong
(74) *Attorney, Agent, or Firm* — Winston Hsu

(57) ABSTRACT

An image device capable of compensating image variation includes at least one image capturer and a compensator. The compensator is electrically connected to the at least one image capturer for generating a 360 degree image, projecting the 360 degree image according to a view angle to generate a plane image corresponding to the view angle, detecting image position variation of at least one object of the plane image, and compensating the image position variation of the at least one object of the plane image, wherein position variation of the image device makes an image position of the at least one object be changed.

18 Claims, 8 Drawing Sheets

IMAGE DEVICE CAPABLE OF COMPENSATING IMAGE VARIATION

CROSS REFERENCE TO RELATED APPLICATIONS

This application claims the benefit of U.S. Provisional Application No. 62/462,363, filed on Feb. 23, 2017 and entitled "Camera with Panoramic Image and Depth Information," the contents of which are incorporated herein by reference.

BACKGROUND OF THE INVENTION

1. Field of the Invention

The present invention relates to an image device, and particularly to an image device that is capable of compensating image variation.

2. Description of the Prior Art

When a user utilizes a traditional camera to shoot images, the traditional camera can first capture an original image, and then determine a size of a displayed image within a range of the original image, wherein the size of the displayed image is less than a size of the original image. Because the size of the displayed image is less than the size of the original image, when the displayed image is shifted by the user moving or rotating the traditional camera, the traditional camera can utilize a digital compensation method provided by the prior art to compensate motion or rotation of the traditional camera, That is to say, the digital compensation method can adjust a displayed position of the displayed image within the range of the original image to compensate motion or rotation of the traditional camera. However, because the digital compensation method only adjusts the displayed position of the displayed image within the range of the original image to compensate motion or rotation of the traditional camera, it is obvious that the digital compensation method is limited to the range of the original image. But, a 360 degree image does not have the above mentioned limitation of the digital compensation method provided by the prior art. Therefore, how to utilize the 360 degree image to improve the digital compensation method provided by the prior art is an important issue for a camera designer.

SUMMARY OF THE INVENTION

An embodiment of the present invention provides an image device capable of compensating image variation. The image device includes at least one image capturer and a compensator. The compensator is electrically connected to the at least one image capturer for generating a 360 degree image, projecting the 360 degree image to generate a plane image corresponding to a view angle according to the view angle, detecting image position variation of at least one object of the plane image, and compensating the image position variation of the at least one object of the plane image, wherein position variation of the image device makes an image position of the at least one object be changed.

Another embodiment of the present invention provides an image device capable of compensating image variation. The image device includes at least one image capturer and a compensator. The compensator is electrically connected to the at least one image capturer for generating a 360 degree image, projecting the 360 degree image to generate a plurality of plane images corresponding to a plurality of view angles according to the plurality of view angles, detecting image position variation of at least one object of the plurality of plane images, and compensating the image position variation of the at least one object of the plurality of plane images, wherein position variation of the image device makes an image position of the at least one object be changed.

Another embodiment of the present invention provides an image device capable of compensating image variation. The image device includes at least one image capturer and a compensator. The compensator is electrically connected to the at least one image capturer for generating a non-planar projection image, projecting the non-planar projection image to generate a plane image corresponding to a view angle according to the view angle, detecting image position variation of at least one object of the plane image, and compensating the image position variation of the at least one object of the plane image, wherein position variation of the image device makes an image position of the at least one object be changed.

The present invention provides an image device capable of compensating image variation. Because a 360 degree image (a panorama image or a spherical image) generated by the image device includes all image information of 360 degree space surrounding an optical center of the 360 degree image, the image device of the present invention utilizes the above mentioned characteristic of the 360 degree image to overcome a disadvantage of a digital compensation method provided by the prior art being limited to a range of an original image. Therefore, compared to prior art, the image device can be suitable for a 360 degree full-range image stabilization application.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
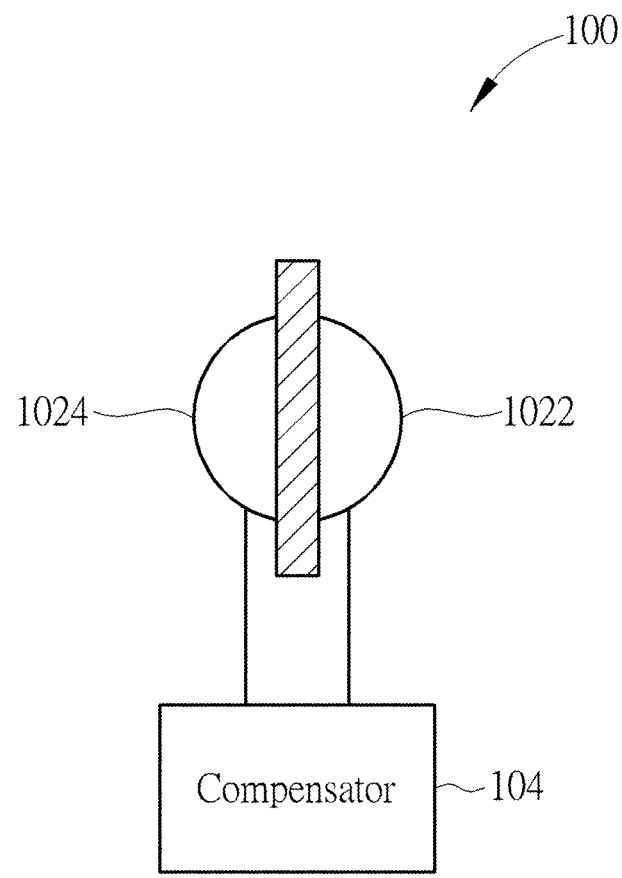
FIG. 1A is a diagram illustrating an image device capable of compensating image variation according to an embodiment of the present invention.
Figure 1B:
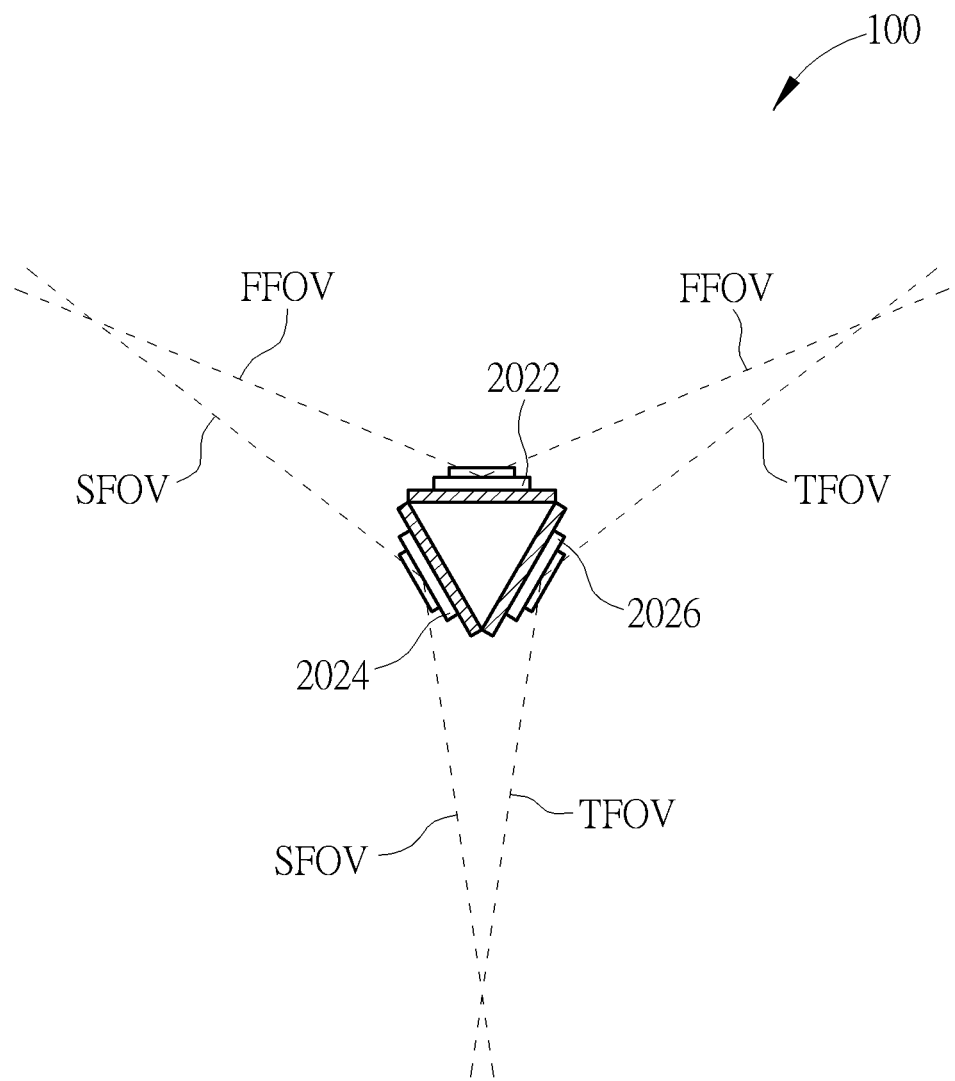
FIG. 1B is a diagram illustrating the image device including three image capturers.

Please refer to FIG. 1A. FIG. 1A is a diagram illustrating an image device 100 capable of compensating image variation according to an embodiment of the present invention. As shown in FIG. 1A, the image device 100 includes image capturers 1022, 1024 and a compensator 104, wherein the image capturers 1022, 1024 are fish eye image capturers. But, the present invention is not limited to the image device 100 including the image capturers 1022, 1024. That is to say, the image device 100 can include at least one image capturer. In addition, the present invention is also not limited to the image capturers 1022, 1024 are fish eye image capturers. For example, as shown in FIG. 1B, the image device 100 can included image capturers 2022, 2024, 2026, and the image capturers 2022, 2024, 2026 are non-fish eye image capturers, wherein the image capturer 2022 has a first view angle FFOV, the image capturer 2024 has a second view angle SFOV, the image capturer 2026 has a third view angle TFOV, and FIG. 1B is not shown the compensator 104. In addition, it is obvious to those of ordinary skill in the art that each image capturer of the image capturers 1022, 1024, 2022, 2024, 2026 at least includes a lens and an image sensor (e.g. charge-coupled device (CCD) image sensor, or complementary metal-oxide-semiconductor (CMOS) image sensor).

Figure 2:
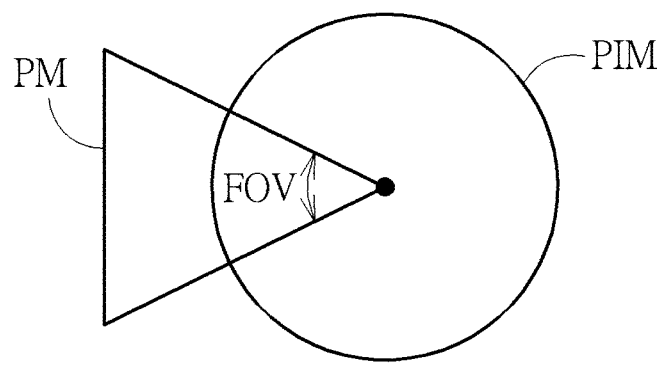
FIG. 2 is a diagram illustrating a view angle and the 360 degree image.
Figure 3:
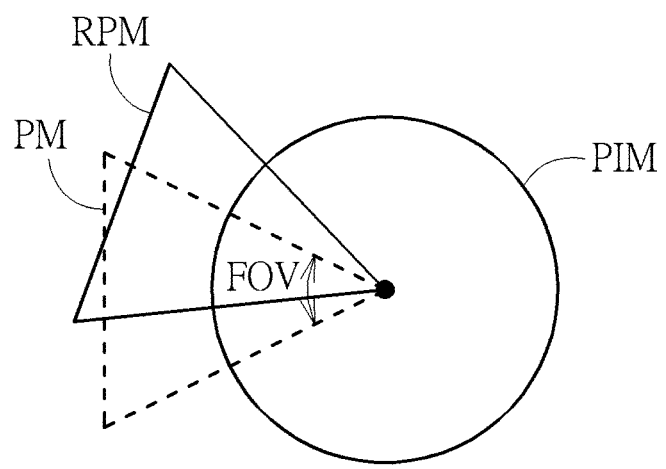
FIG. 3 is a diagram illustrating an image corresponding to the rotation of the at least one object of the plane image.
Figure 4:
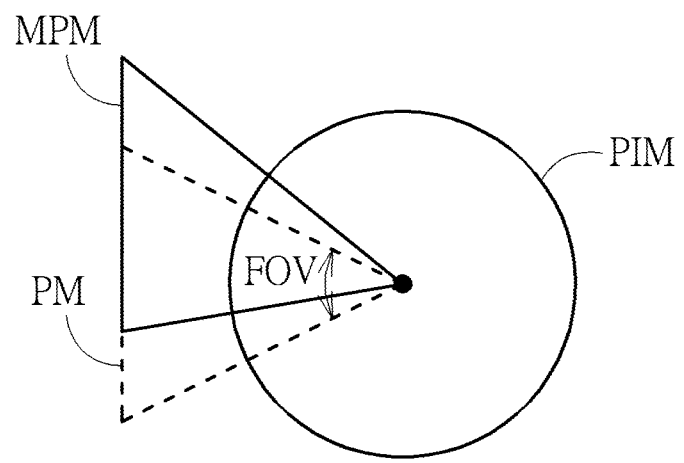
FIG. 4 is a diagram illustrating an image corresponding to the motion of the at least one object of the plane image.

As shown in FIG. 1A, the compensator 104 is electrically connected to the image capturers 1022, 1024 for generating a 360 degree image PIM (as shown in FIG. 2) according to images captured by the image capturers 1022, 1024, wherein FIG. 2 is a diagram illustrating a view angle FOV and the 360 degree image PIM, and the 360 degree image PIM is a panorama image or a spherical image. As shown in FIG. 2, the compensator 104 can project the 360 degree image PIM to generate a plane image PM corresponding to the view angle FOV according to the view angle FOV, wherein the plane image PM is located on a projection plane corresponding to the view angle FOV. Similarly, the compensator 104 can further generate a previous 360 degree image according to the images captured by the image capturers 1022, 1024, and project the previous 360 degree image to generate a previous plane image corresponding to the view angle FOV according to the view angle FOV, wherein the 360 degree image PIM and the previous 360 degree image correspond to two time point, respectively. After the compensator 104 generates the plane image PM and the previous plane image, the compensator 104 can utilize a feature point matching method to detect image position variation of at least one object of the plane image PM according to the plane image PM and the previous plane image, wherein position variation of the image device 100 makes an image position of the at least one object of the plane image PM be changed, and the feature point matching method is obvious to those of ordinary skill in the art, so further description thereof is omitted for simplicity. In addition, in another embodiment of the present invention, the compensator 104 can utilize an optical flow method corresponding to the at least one object of the plane image PM to detect the image position variation of the at least one object of the plane image PM according to the plane image PM and the previous plane image, wherein the optical flow corresponding to the at least one object of the plane image PM can be generated by feature points corresponding to the at least one object of the plane image PM, and the optical flow corresponding to the at least one object of the plane image PM is also obvious to those of ordinary skill in the art, so further description thereof is omitted for simplicity. In addition, the image position variation of the at least one object of the plane image PM includes at least one of motion and rotation of the at least one object of the plane image PM, wherein FIG. 3 is a diagram illustrating an image RPM corresponding to the rotation of the at least one object of the plane image PM, and FIG. 4 is a diagram illustrating an image MPM corresponding to the motion of the at least one object of the plane image PM. In addition, in another embodiment of the present invention, the present invention can place a predetermined texture (e.g. Quick Response Code, QR code) in a surrounding which the image device 100 is located in, and then the compensator 104 can determine the image position variation of the at least one object of the plane image PM according to the predetermined texture within the plane image PM. In addition, in another embodiment of the present invention, the image device 100 further includes a microelectromechanical systems device (e.g. a gyroscope or an accelerometer), so the compensator 104 can utilize signal variation outputted by the microelectromechanical systems device to detect the image position of the image device 100, and combine the position variation of the image device 100 with the image position variation of the at least one object of the plane image PM; and finally, the compensator 104 can compensate the image position variation of the at least one object of the plane image PM according to a combination result. In addition, in another embodiment of the present invention, the compensator 104 directly utilizes images near equators of the 360 degree image PIM and the previous 360 degree image to detect image position variation of at least one object of the 360 degree image PIM.

After the compensator 104 utilizes the feature point matching method to determine the image position variation of the at least one object of the plane image PM, the compensator 104 can utilize an algorithm provided by the prior art to determine elements of a compensation matrix T according to the image position variation of the at least one object of the plane image PM, wherein the compensation matrix T is shown in equation (1):

$$T = \begin{bmatrix} a_{00}x + a_{01}y + b_{00} \\ a_{10}x + a_{11}y + b_{10} \end{bmatrix} \quad (1)$$

As shown in equation (1), coefficients $a_{00} \sim a_{11}$ correspond to a rotation matrix of the projection plane for compensating rotation of the at least one object of the plane image PM; coefficients $b_{00} \sim b_{10}$ correspond to displacement of the projection plane for compensating motion of the at least one object of the plane image PM. Therefore, in one embodiment of the present invention, the compensator 104 can compensate motion and rotation of the at least one object of the plane image PM according to the compensation matrix T.

Figure 5:
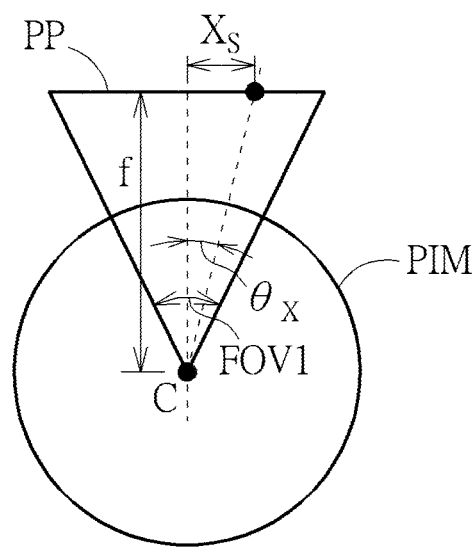
FIG. 5 is a diagram illustrating converting motion corresponding to an X axis of the three axes of the space rectangular coordinate system into an element of the rotation compensation matrix corresponding to a rotation angle corresponding to the X axis of the three axes.

In addition, in one embodiment of the present invention, the compensator 104 can convert the compensation matrix T into a rotation compensation matrix, and elements of the rotation compensation matrix are generated according to rotation angles corresponding to three axes of a space rectangular coordinate system, wherein the rotation compensation matrix is a 3×3 matrix. Please refer to FIG. 5. FIG. 5 is a diagram illustrating converting motion Xs corresponding to an X axis of the three axes of the space rectangular coordinate system into an element $\theta_x$ of the rotation compensation matrix corresponding to a rotation angle corresponding to the X axis of the three axes. As shown in FIG. 5, because a distance between an optical center C of the 360 degree image PIM and a projection plane PP corresponding to a view angle FOV1 is a virtual focal length f of a plane image, the element $\theta_x$ can be determined by equation (2):

$$\theta_x = \arctan(Xs/f) \quad (2)$$

Similarly, an element $\theta_y$ of the rotation compensation matrix corresponding to a rotation angle corresponding to a Y axis of the three axes can be determined by equation (3):

$$\theta_y = \arctan(Ys/f) \quad (3)$$

As shown in equation (3), Ys is motion corresponds to the Y axis of the three axes of the space rectangular coordinate system. In addition, an element $\theta_z$ of the rotation compensation matrix corresponding to a rotation angle corresponding to a Z axis of the three axes can be determined by the coefficients $a_{00} \sim a_{11}$ of the compensation matrix T.

Figure 6:
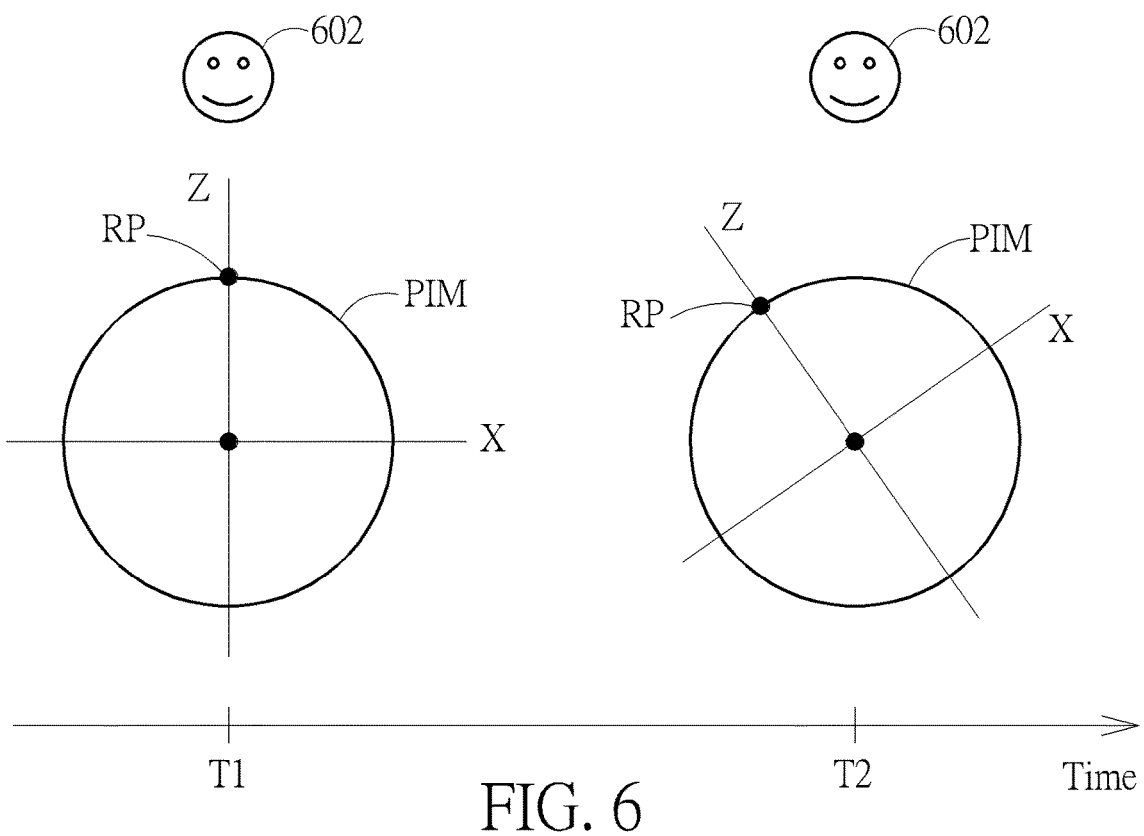
FIG. 6 is a diagram illustrating the image device being rotated along an X-Z plane to make a reference point of the 360 degree image be shifted.
Figure 7:
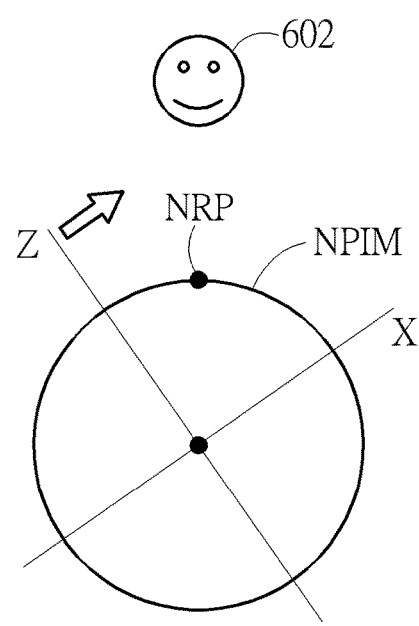
FIG. 7 is a diagram illustrating the compensator generating a new 360 degree image according to a rotation compensation matrix to compensate the image position variation of the shot object of the plane image.

Please refer to FIG. 6. FIG. 6 is a diagram illustrating the image device 100 being rotated along an X-Z plane to make a reference point RP of the 360 degree image PIM be shifted, and the reference point RP can act as an origin of the 360 degree image PIM (that is, a line of zero degree longitude of the 360 degree image PIM passes through the reference point RP), wherein FIG. 6 utilizes rotation of the image device 100 along the X-Z plane (neglecting the Y axis of the three axes) to describe the present invention for simplicity. As shown in FIG. 6, at a time point T1, the reference point RP of the 360 degree image PIM generated by the image device 100 is toward a shot object 602. At a time point T2, the image device 100 is rotated along the X-Z plane to make the reference point RP of the 360 degree image PIM be shifted left, resulting in the shot object 602 shown in the plane image PM having an image position variation (wherein the image position variation of the shot object 602 of the plane image PM can be referred to FIG. 3 and FIG. 4). Meanwhile, the compensator 104 can generate a new 360 degree image NPIM according to a rotation compensation matrix to compensate the image position variation (as shown in FIG. 7) of the shot object 602 of the plane image PM, wherein a reference point NRP of the new 360 degree image NPIM is toward the shot object 602, and the reference point NRP acts as an origin of the new 360 degree image NPIM (that is, a line of zero degree longitude of the new 360 degree image NPIM passes through the reference point NRP).

Figure 8:
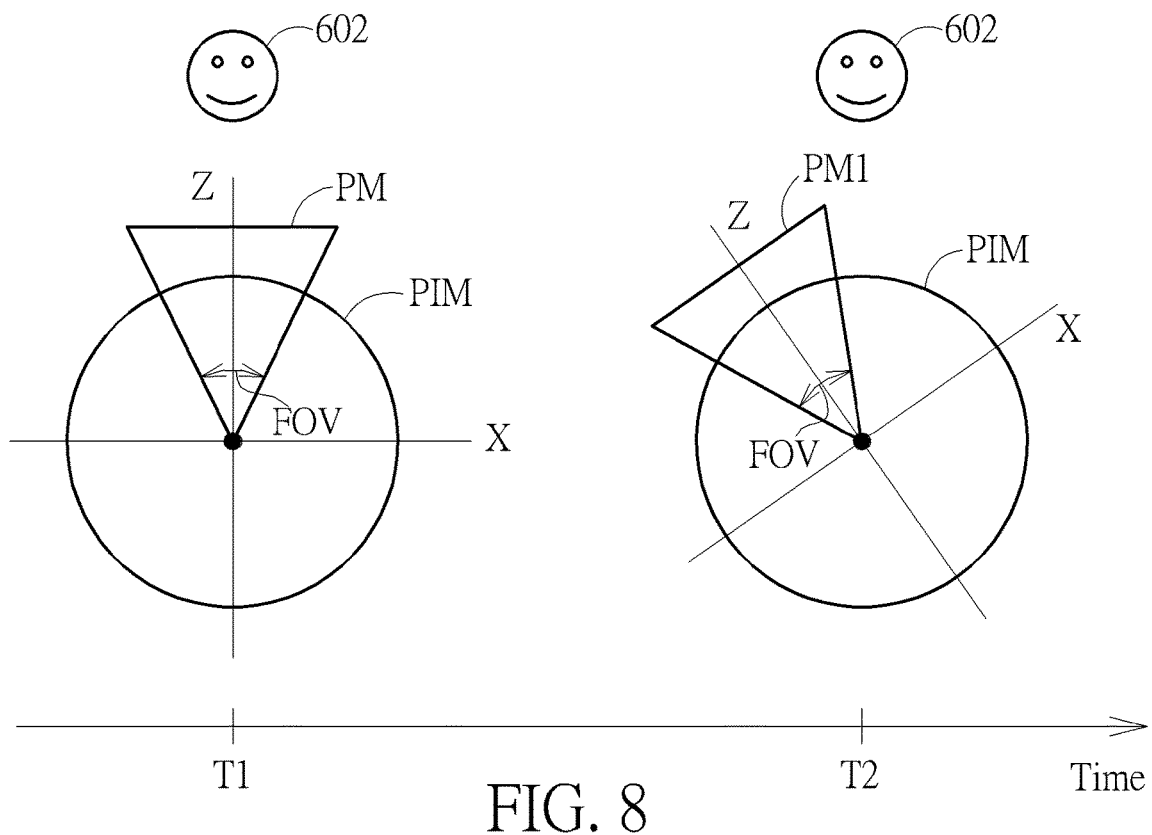
FIG. 8 is a diagram illustrating the image device being rotated along the X-Z plane.
Figure 9:
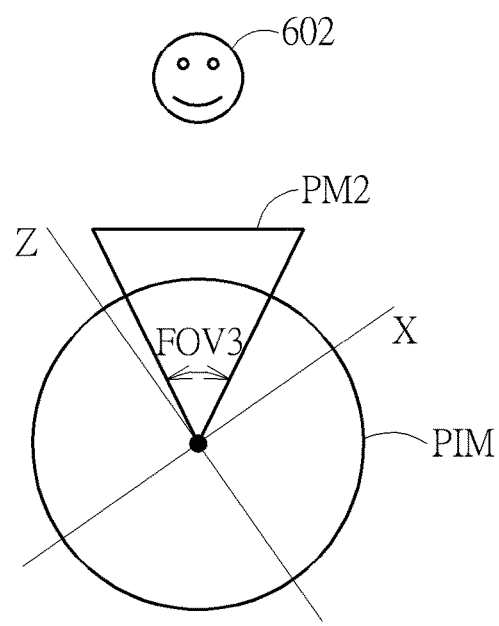
FIG. 9 is a diagram illustrating the viewer determining a new view angle according to a rotation compensation matrix and projecting the 360 degree image according to the new view angle to generate a new plane image to compensate the image position variation of the shot object corresponding to the plane image.

In addition, please refer to FIG. 8. FIG. 8 is a diagram illustrating the image device 100 being rotated along the X-Z plane, wherein FIG. 8 utilizes rotation of the image device 100 along the X-Z plane (neglecting the Y axis of the three axes) to describe the present invention for simplicity. As shown in FIG. 8, at a time point T1, a viewer (not shown in FIG. 8) further included in the image device 100 can project the 360 degree image PIM to generate the plane image PM according to the view angle FOV, and a center of the plane image PM is toward the shot object 602. At a time point T2, the image device 100 is rotated along the X-Z plane, wherein the shot object 602 will be located outside the plane image PM1 corresponding to the view angle FOV. Meanwhile, as shown in FIG. 9, the viewer can obtain a rotation compensation matrix to determine a new view angle FOV3 according to a relationship between the plane image PM1 and the plane image PM, and project the 360 degree image PIM according to the new view angle FOV3 to generate a new plane image PM2 to compensate the image position variation of the shot object 602 corresponding to the plane image PM1. In addition, a plane image related to the viewer can directly act as a displayed plane image utilized by a user to watch the 360 degree image PIM (e.g. the plane image PM and the new plane image PM2 can directly act as the displayed plane image utilized by the user to watch the 360 degree image PIM), but the plane image PM1 does not act as the displayed plane image utilized by the user to watch the 360 degree image PIM. However, in another embodiment of the present invention, the displayed plane image and the plane image related to the viewer are different, wherein when the displayed plane image and the plane image related to the viewer are different, the present invention can only compensate the displayed plane image, rather than compensating the plane image related to the viewer, or simultaneously compensate the displayed plane image and the plane image related to the viewer.

Figure 10A:
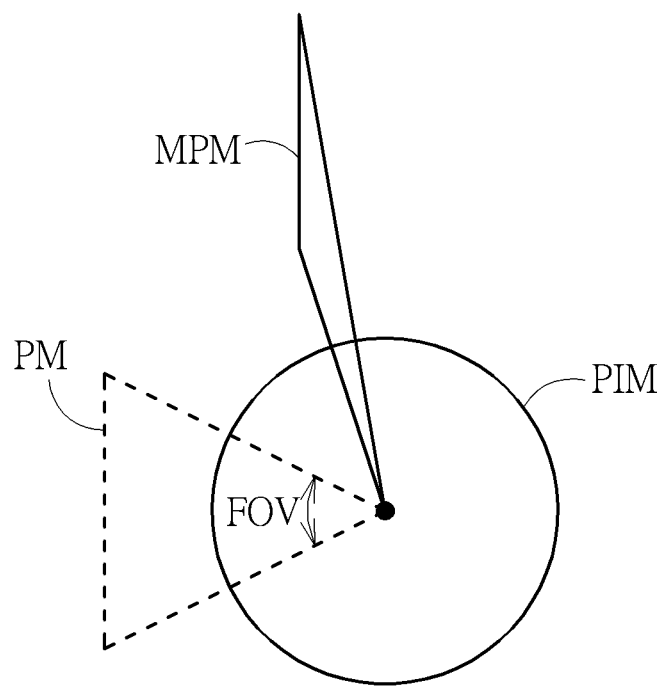
FIG. 10A is a diagram illustrating the image corresponding to the motion of the at least one object of the plane image being seriously distorted.
Figure 10B:
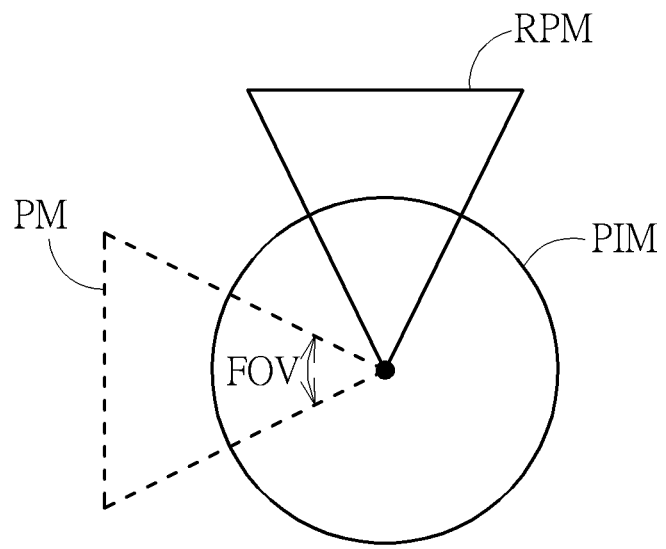
FIG. 10B is a diagram illustrating the image corresponding to the rotation of the at least one object of the plane image being not distorted.

Generally speaking, a traditional digital compensation method utilizes a motion compensation (that is, utilizing the compensation matrix T) to compensate motion and rotation of the image device 100 (because the motion compensation has lower cost). However, when the image device 100 is rotated nearly 90 degree, the image MPM corresponding to the motion of the at least one object of the plane image PM is seriously distorted (as shown in FIG. 10A). Therefore, when the image device 100 is rotated nearly 90 degree, the traditional digital compensation method hardly utilizes the motion compensation to compensate motion and rotation of the image device 100. But, as shown in FIG. 10B, when the image device 100 is rotated nearly 90 degree, the image RPM corresponding to the rotation of the at least one object of the plane image PM is not distorted. That is to say, when the image device 100 is rotated nearly 90 degree, the compensator 104 can still effectively compensate the motion and rotation of the at least one object of the plane image PM according to a rotation compensation matrix.

In addition, in another embodiment of the present invention, the compensator 104 can generate a non-planar projection image according to the images captured by the image capturers 1022, 1024, wherein the non-planar projection image is a non-pinhole projection image. For example, the non-planar projection image can be the 360 degree image as mentioned above. Alternatively, the non-planar projection image can be a curved surface image less than 360 degree (e.g. 90 degree curved surface image, 120 degree curved surface image, 180 degree curved surface image, or 270 degree curved surface image). Because the non-planar projection image also has the above-mentioned characteristic of the 360 degree image, the compensator 104 can also utilize the non-planar projection image to compensate motion and rotation of at least one object of a plane image corresponding to the non-planar projection image.

In addition, the compensator 104 can be a field programmable gate array (FPGA) with the above mentioned functions of the compensator 104, or an application-specific integrated circuit (ASIC) with the above mentioned functions of the compensator 104, or a software module with the above mentioned functions of the compensator 104. In addition, the viewer can be a field programmable gate array (FPGA) with the above mentioned functions of the viewer, or an application-specific integrated circuit (ASIC) with the above mentioned functions of the viewer, or software module with the above mentioned functions of the viewer.

Figure 11:
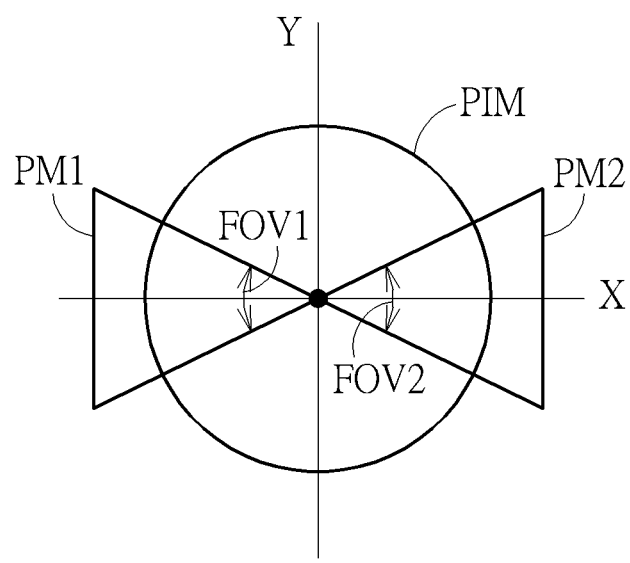
FIG. 11 is a diagram illustrating the compensator projecting the 360 degree image to generate 2 plane images corresponding to 2 view angles according to the two view angles.

In addition, because the plane image PM may be a no texture image or an unstable image, in another embodiment of the present invention, the compensator 104 can project the 360 degree image PIM to generate a plurality of plane images corresponding to a plurality of view angles according to the plurality of view angles. For example, as shown in FIG. 11, the compensator 104 can project the 360 degree image PIM to generate 2 plane images PM1, PM2 corresponding to 2 view angles FOV1, FOV2 according to the view angles FOV1, FOV2. Although the compensator 104 can obtain 2 rotation compensation matrixes corresponding to the view angles FOV1, FOV2 according to image position variation of at least one object of each plane image of the plane images PM1, PM2 respectively, wherein each rotation compensation matrix of the 2 rotation compensation matrixes has an element $\theta_x$ corresponding to a rotation angle corresponding to the X axis of the space rectangular coordinate system, an element $\theta_y$ corresponding to a rotation angle corresponding to the Y axis of the space rectangular coordinate system, and an element $\theta_z$ corresponding to a rotation angle corresponding to the Z axis of the space rectangular coordinate system, the compensator 104 can also integrate the 2 rotation compensation matrixes into an final rotation compensation matrix according to the view angle FOV1 (or the view angle FOV2). Taking the view angle FOV1 as an example, when the image device 100 is rotated along an X-Y plane to make the view angle FOV1 be rotated down, the view angle FOV2 is rotated up opposite to the view angle FOV1. Therefore, the compensator 104 can calculate an angle change sum of the view angle FOV2 and the view angle FOV1 according to the view angle FOV1 (or the view angle FOV2) and the above mentioned relative relationship between the view angle FOV2 and the view angle FOV1. Then, in one embodiment of the present invention, the compensator 104 can average the angle change sum to obtain an element $\theta_z$ of the final rotation compensation matrix. In addition, elements $\theta_x$, $\theta_y$ of the final rotation compensation matrix can also be obtained according to the above mentioned principle, so further description thereof is omitted for simplicity. In addition, after the compensator 104 obtains the final rotation compensation matrix, the compensator 104 can generate a new 360 degree image (can be referred to FIG. 7) to compensate the image position variation of the at least one object of the each plane image of the plane images PM1, PM2 according to the final rotation compensation matrix.

To sum up, because a 360 degree image (a panorama image or a spherical image) includes all image information of 360 degree space surrounding an optical center of the 360 degree image, the image device of the present invention utilizes the above mentioned characteristic of the 360 degree image to overcome a disadvantage of a digital compensation method provided by the prior art being limited to a range of an original image. Therefore, compared to prior art, the image device can be suitable for a 360 degree full-range image stabilization application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device capable of compensating image variation, comprising:
   at least one image capturer; and
   a compensator electrically connected to the at least one image capturer for generating a 360 degree image, projecting the 360 degree image to generate a plane image corresponding to a view angle according to the view angle, detecting image position variation of at least one object of the plane image, and compensating the image position variation of the at least one object of the plane image, wherein position variation of the image device makes an image position of the at least one object be changed.

2. The image device of claim 1, wherein the 360 degree image is a panorama image.

3. The image device of claim 1, wherein the 360 degree image is a spherical image.

4. The image device of claim 1, wherein the image position variation of the at least one object comprises at least one of motion and rotation of the at least one object.

5. The image device of claim 1, wherein the compensator utilizes a feature point matching method to detect the image position variation of the at least one object.

6. The image device of claim 1, wherein the compensator determines elements of a compensation matrix according to the image position variation of the at least one object.

7. The image device of claim 6, wherein the compensator is further used for converting the compensation matrix into a rotation compensation matrix, and elements of the rotation compensation matrix are generated according to rotation angles corresponding to three axes of a space rectangular coordinate system.

8. The image device of claim 7, further comprising:
   a viewer determining a new view angle to compensate the image position variation of the at least one object according to the rotation compensation matrix.

9. The image device of claim 8, wherein the viewer projects the 360 degree image to generate a new plane image according to the new view angle to compensate the image position variation of the at least one object, and the new plane image is a displayed plane image provided to a user to watch.

10. The image device of claim 8, wherein the viewer compensates a displayed plane image provided to a user to watch according to the new view angle.

11. The image device of claim 7, wherein the compensator generates a new 360 degree image to compensate the image position variation of the at least one object according to the rotation compensation matrix.

12. The image device of claim 1, wherein the compensator utilizes a predetermined image recognition method to detect the image position variation of the at least one object.

13. The image device of claim 1, further comprising:
   a microelectromechanical systems (MEMS) device, wherein the compensator utilizes the MEMS device to detect the position variation of the image device, and combines the position variation of the image device with the image position variation of the at least one object of the plane image.

14. The image device of claim 1, wherein the compensator utilizes an optical flow method to detect the image position variation of the at least one object.

15. An image device capable of compensating image variation, comprising:

at least one image capturer; and a compensator electrically connected to the at least one image capturer for generating a 360 degree image, projecting the 360 degree image to generate a plurality of plane images corresponding to a plurality of view angles according to the plurality of view angles, detecting image position variation of at least one object of the plurality of plane images, and compensating the image position variation of the at least one object of the plurality of plane images, wherein position variation of the image device makes an image position of the at least one object be changed.

16. The image device of claim 15, wherein the compensator determines a rotation compensation matrix according to the image position variation of the at least one object, elements of the rotation compensation matrix are generated according to rotation angles corresponding to three axes of a space rectangular coordinate system, and the rotation compensation matrix corresponds to a view angle of the plurality of view angles.

17. The image device of claim 16, wherein the compensator generates a new 360 degree image to compensate the image position variation of the at least one object according to the rotation compensation matrix.

18. An image device capable of compensating image variation, comprising:

at least one image capturer; and a compensator electrically connected to the at least one image capturer for generating a non-planar projection image, projecting the non-planar projection image to generate a plane image corresponding to a view angle according to the view angle, detecting image position variation of at least one object of the plane image, and compensating the image position variation of the at least one object of the plane image, wherein position variation of the image device makes an image position of the at least one object be changed.

* * * * *